July 3, 1928.

T. G. MYERS 1,675,419

PROCESS OF INSULATING MOTOR WINDINGS

Filed Feb. 9, 1927

INVENTOR:
THOMAS G. MYERS,
BY
ATTORNEY.

Patented July 3, 1928.

1,675,419

UNITED STATES PATENT OFFICE.

THOMAS G. MYERS, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA.

PROCESS OF INSULATING MOTOR WINDINGS.

Application filed February 9, 1927. Serial No. 166,899.

My invention relates to electric motors, and it particularly relates to a method of insulating the windings of such a motor.

The foremost reasons a motor "burns out" are that the insulation between the conductors of the winding is inadequate, the insulation carbonizes, and the conductors mechanically chafe against one another when the motor is in operation and cause short-circuits.

It is an object of this invention to provide a method of insulating motor windings in which the insulation will be caused to enter spaces between the conductors of the winding and form an efficient insulation barrier.

Another object of the invention is to provide a method of this nature in which the insulation will lock the conductors of the winding from relative mechanical movement.

A further object of the invention is to provide a method of the above nature in which the insulation is noncarbonizing.

Other objects and advantages of the invention will be made evident hereinafter.

In the following description I will describe the method of my invention in its use in forming an insulation for windings of a stator. I wish it to be understood, however, that my invention may be used for insulating other windings, for instance, magneto windings or windings of electrical measuring apparatus; and I wish to have my invention construed by the appended claims.

Referring to the drawing in which the invention is illustrated:

Figure 1:
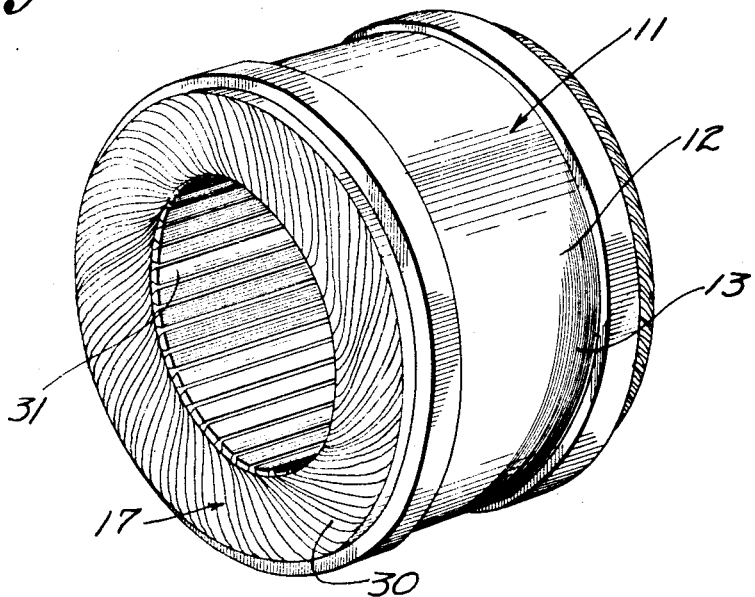
Fig. 1 is a perspective view of a stator having an insulation barrier applied thereto by the method of this invention.
Figure 2:
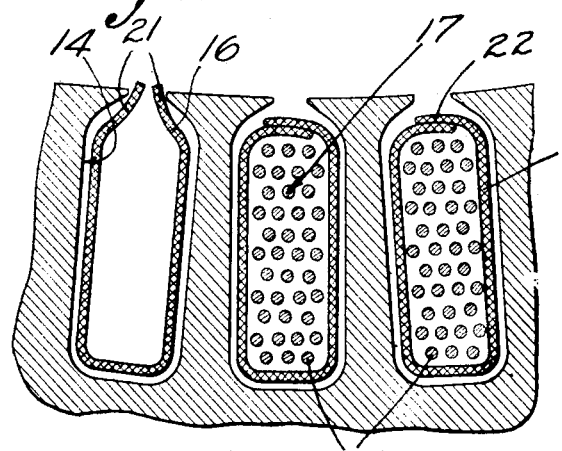
Fig. 2 is an enlarged fragmentary cross section showing certain steps in placing the windings in slots of the stator.
Figure 4:
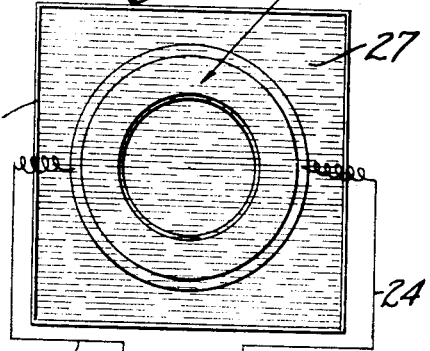
Fig. 4 is a fragmentary view showing a step in the process of the invention.
Figure 3:
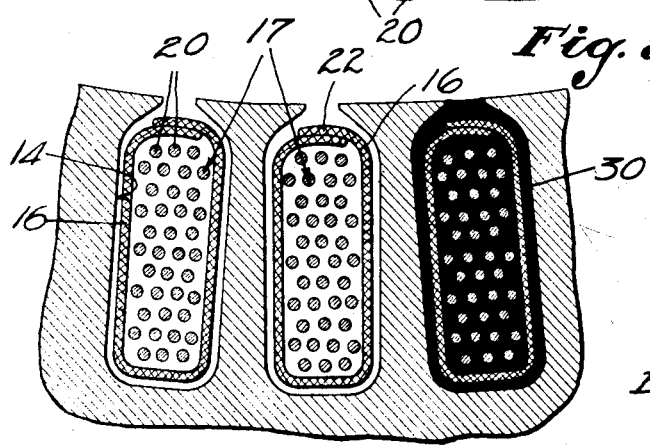
Fig. 3 is an enlarged fragmentary section similar to Fig. 2 but showing the insulation barrier of the invention enveloping the conductors of the winding.
Figure 3:
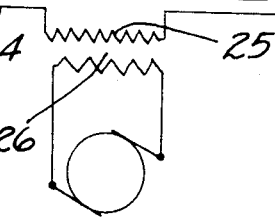

Referring in detail to the drawing, the numeral 11 represents a stator which has a magnetic body 12 formed from laminations 13. The laminations 13 have openings formed therein which cooperate, as illustrated in Figs. 2 and 3, to provide stator slots 14. The first step in winding the stator 11 is to place an asbestos sheath 16 in each of the slots 14. The sheath 16 extends the full length of the slot 14 in which it is placed and provides a heat-proof wall. The next step in the method is to place portions of a winding 17 in the slots 14 inside the sheath 16. The winding 17 is formed from conductors 20. The conductors 20 are placed in the slots 14 so that they are somewhat loose and are free to move relative to each other. Edges 21 of the asbestos sheaths 16 are then folded over the upper parts of the conductors 20, as illustrated at 22 in Figs. 2 and 3. The winding is then connected in an electric circuit 24 as shown in Fig. 4, which includes a secondary 25 of a transformer 26. The stator 11 is then immersed in a body of liquid insulation 27 which is retained in a suitable receptacle 28. The insulation material is preferably a substance known on the market as "asbestosite" which is a compound having an asbestos base. It should be understood, however, that I may use other liquid insulations if I desire.

The transformer 26 is now energized, and an alternating current is sent through the winding 17. This alternating current is of such a strength as to cause the winding to heat from 100° C. to 200° C. The conductors 20 of the winding 17 being loose in the slots 14 vibrate in harmony with the frequency of the current. The heat of the winding 17 causes the liquid insulation to become thinner, and the vibration of the conductors draws the liquid into the spaces between them. The liquid works into these spaces and forms a solid wall between the different conductors. It is found that the liquid insulation will quickly fill the spaces between the different conductors 20 and the spaces between the winding 17 and the walls which form the slots 14. In Fig. 3 the numeral 30 represents an insulation barrier formed by the liquid insulation which completely envelope the conductors 20 of the winding 17. The insulation material covers the entire stator, and it is desirable at this time to wipe a face 31 which surrounds an opening through the stator in which a rotor is placed when the stator is assembled in a motor.

The next operation is to harden the insulation barrier 30. This is accomplished by placing the entire stator 11 in an oven and baking it for a period of from eight to fourteen hours. This, causes the liquid insulation to form into a hard and solid insulation barrier which envelops each of the conductors 20.

The advantages of a stator resulting from this method of applying insulation may be briefly enumerated as follows: In the first place, by using asbestosite there will be no carbonizing of the insulation, and consequently the winding will not burn out because of carbonization as occurs in the ordinary motor where insulation materials, capable of carbonizing, are used. Another advantage is that the insulation barrier 30 completely envelops the conductors 20, filling all of the interstices. The insulation barrier 30 after it has been baked is very hard and absolutely locks the conductors from vibration so that there cannot possibly be any chafing.

I claim as my invention:

1. The method for the purpose stated comprising: forming conductors into a winding; immersing said winding in a body of liquid insulation; and vibrating the conductors of said winding with respect to each other in a manner to cause said liquid insulation to enter spaces between said conductors.

2. The method for the purpose stated comprising: forming conductors into a winding; immersing said winding in a body of liquid insulation; and passing an alternating current through said winding in order to vibrate the conductors thereof in a manner to cause said liquid insulation to enter the spaces between said conductors.

3. The method for the purpose stated comprising: forming conductors into a winding; immersing said winding in a body of liquid insulation; vibrating the conductors of said winding with respect to each other in a manner to cause said liquid insulation to enter spaces between said conductors; and hardening said liquid insulation.

4. The method for the purpose stated comprising: forming conductors into a winding; immersing said winding in a body of liquid insulation; vibrating the conductors of said winding with respect to each other in a manner to cause said liquid insulation to enter spaces between said conductors; and baking said winding in order to harden said liquid insulation.

5. The method for the purpose stated comprising: forming conductors into a winding; immersing said winding in a body of liquid insulation; passing an alternating current through said winding in order to vibrate the conductors thereof in a manner to cause said liquid insulation to enter the spaces between said conductors; and baking said winding in order to harden said liquid insulation.

6. The method for the purpose stated comprising: placing conductors in slots of a magnetic body in order to form a winding; immersing said magnetic body having said winding in the body of liquid insulation; vibrating said conductors of said winding with respect to each other in order to cause said liquid insulation to enter the spaces between said conductors; and baking said liquid insulation in order to harden it.

7. The method for the purpose stated comprising: placing conductors in slots of a magnetic body in order to form a winding; immersing said magnetic body having said winding in the body of liquid insulation; vibrating and heating the conductors of said winding in order to cause said liquid insulation to flow freely into the spaces between said conductors; and baking said liquid insulation in order to harden it.

8. The method for the purpose stated comprising: placing conductors in slots of a magnetic body in order to form a winding; immersing said magnetic body having said winding in the body of liquid insulation; passing an alternating current through said conductors of said winding in order to vibrate said conductors so that said liquid insulation will flow into the spaces between said conductors; and baking said liquid insulation in order to harden it.

In testimony whereof, I have hereunto set my hand at Los Angeles, California, this 3rd day of February, 1927.

THOMAS G. MYERS.